Oct. 13, 1970     A. L. HECK ET AL     3,533,602
APPARATUS FOR RIDDLING BOTTLED WINES
Filed May 16, 1966     4 Sheets-Sheet 4
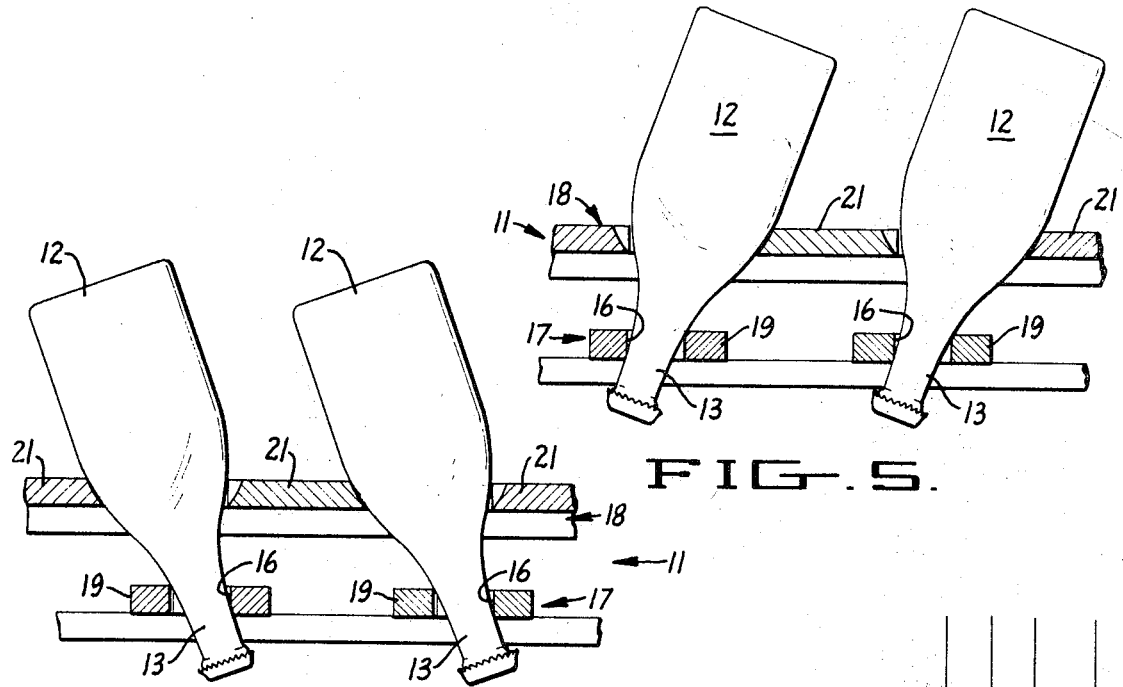
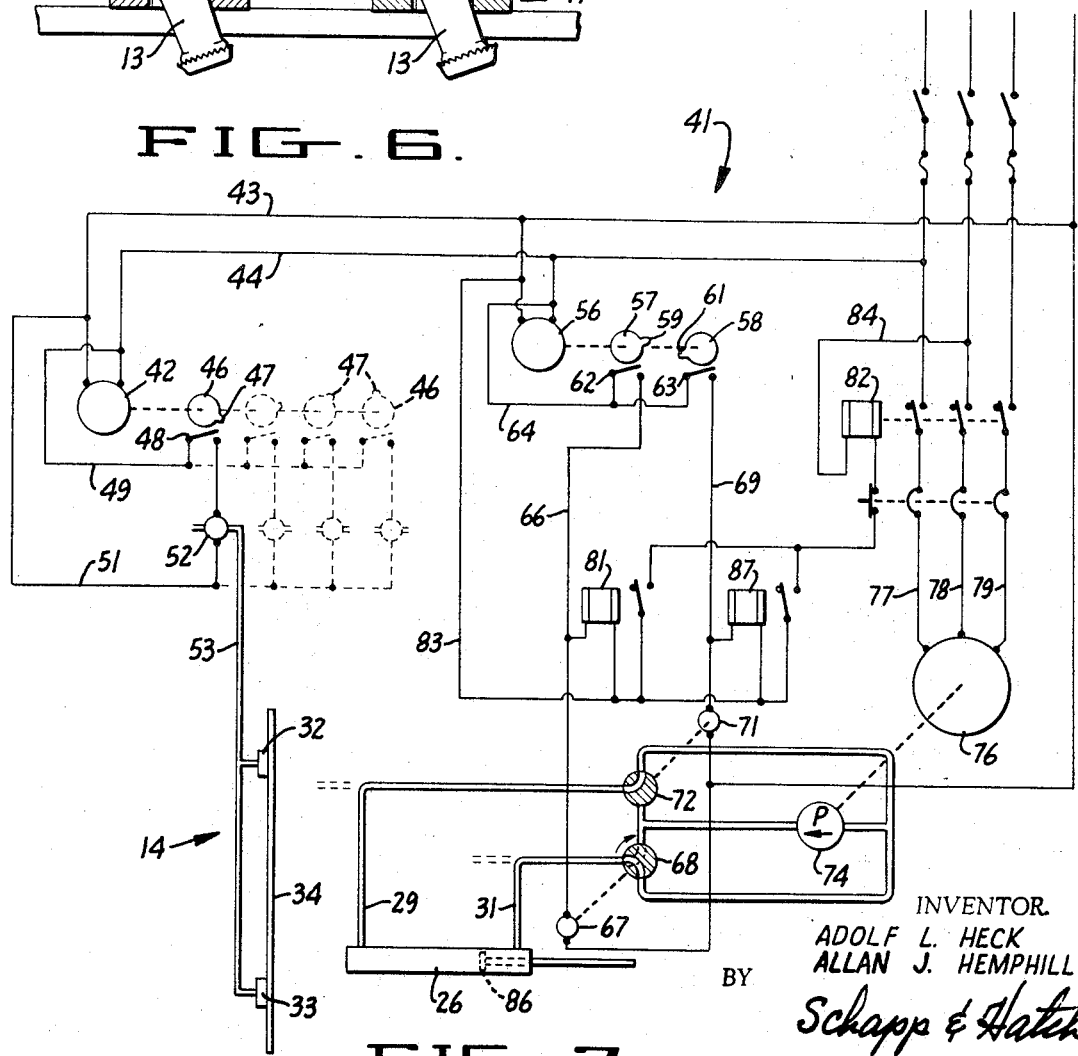
INVENTOR.
ADOLF L. HECK
ALLAN J. HEMPHILL
BY Schapp & Hatch
ATTORNEYS

United States Patent Office 3,533,602
Patented Oct. 13, 1970

3,533,602
APPARATUS FOR RIDDLING BOTTLED WINES
Adolf L. Heck, Korbel Ranch, Guerneville, Calif. 95446, and Allan J. Hemphill, Guerneville, Calif.; said Hemphill assignor to said Heck
Filed May 16, 1966, Ser. No. 550,264
Int. Cl. B01f *11/00*
U.S. Cl. 259—54          8 Claims

ABSTRACT OF THE DISCLOSURE

Apparatus for riddling bottled wine comprising rack means adapted for receiving wine bottles in inverted positions and formed for supporting each bottle in a selected one of a plurality of positions inclined from the vertical in different directions, said rack means comprising a plurality of pairs of vertically spaced relatively movable rack members for shifting said bottles between said plurality of positions, with the lower rack member of each pair being formed with bottle receiving means at spaced locations and the upper rack member of each pair being formed for engaging the bottles suported on the lower rack members so as to maintain the bottles in desired position; the bottles thereby being movable through a vertical arc from one tilt to another on horizontally reciprocable relative movement of the upper and lower rack, and vibrator means being provided for vibrating the bottles in order to increase the rate of settlement of the sediment within the bottles.

---

This invention relates to improvements in the art of riddling wines such as champagne, and more particularly to manipulation of the bottled wine to achieve the riddling effect.

In the making of fine wines, and particularly in the making of champaigne which is fermented in the bottle, it is necessary to remove all sediment in order for the wine to have a sparkling, clear appearance. This sediment is a natural result of the fermentation process and includes yeast and other solid matter, often in the form of extremely fine particles which would impart a cloudy appearance if left in the wine. The process of removing such sediment from bottled wine has come to be known as "riddling."

The traditional method of accomplishing riddling is by supporting the bottle in an inverted position inclined about 45° from vertical in a rack and manually "turning" the bottles ¼ revolution per day. This "turning" is accomplished by manually grasping each bottle, pulling it part way out of the rack, rotating the bottle approximately 90°, and thereafter slamming the bottle back into the rack with sufficient force to cause the desired action. The purpose of riddling is to deposit all yeast and other solids at the outlet of the bottle, where they will rest upon a conventional crown cap and from whence they may be removed later. Removal of the accumulated sediment from the bottle is conventionally accomplished by freezing the neck of the bottle, removing the crown cap, ejecting the frozen slug of wine containing the sediment, and then corking the bottle.

The described hand-turning of the bottles in the A frame rack slowly spirals all of the sediment on the glass without placing it back in suspension. This spiral action is quite evident to the eye because of spiral accumulations of sediment on the interior of the bottles during early riddling stages. The main purpose of the described spiralling is to avoid bringing all the large sediment down too quickly at the expense of the smaller particles which must attach themselves to the larger yeast cells to be removed by this process. Without such agglomerating action, the small cells have a tendency to stick to the sides and form "masks."

The present invention is concerned with a novel apparatus for accomplishing riddling by periodically shifting inverted bottles back and forth between positions inclined first to one side of the bottle and then the other, and by periodically applying vibration to the bottles. Instead of spiralling the sediment around the inside of the bottle, the yeast cells, etc. drop vertically from one side of the glass bottle to another, coming closer to the cap with each cycle. It has been found that the described action materially speeds up the riddling process over that which can be achieved by the traditional hand-turning method.

Accordingly, it is an object of the present invention to provide an apparatus for riddling champagne and the like in which all of the yeast and other sedimentary material will be deposited on the cap at the outlet of the bottle for later removal in a manner which is faster and more efficient than previously known methods of riddling.

A further object of the invention is to provide an apparatus for riddling bottled wines wherein the traditional handturning method of manipulating the bottle is replaced by two mechanical operations, to wit, intermittently shifting the inverted bottles back and forth between inclined positions with first one side and then the other side of the bottle underneath, and applying vibration to the bottle to prevent sediment from adhering to the side of the bottle and to encourage such sediment to drop down into the neck of the bottle and rest upon the removable cap.

Another object of the present invention is to provide an apparatus capable of rapidly and efficiently accomplishing the described mechanical operations upon the bottles of wine undergoing riddling.

Yet another object of the invention is to provide an apparatus of the character described in which the bottle shifting and vibrating operations are automatically effected without human attention.

A still further object of the present invention is to provide an apparatus of the character described in which the frequency of the shifting action and the frequency and duration of the vibratory action may be adjusted to provide optimum results with the wine undergoing riddling.

Another object of the present invention is the provision, in an apparatus for carrying out the described riddling operation, of a rack construction in which shifting of all of the bottles in the entire rack may be rapidly and easily accomplished by simple relative lateral movement between rack components.

Further objects and features of advantage will become apparent from the following specification and claims.

The method for riddling wine of the present invention includes the steps of holding the bottle of wine to be riddled in an inverted, inclined position, with one side of the bottle underneath, shifting the bottle to a similar position but with another side of the bottle underneath, holding the bottle in the second-named position for a period sufficiently long for sediment in the contents of the bottle to settle by a desired amount, and shifting said bottle back to its original position. Again, the bottle is held in the original position long enough for the sediment to settle, and the steps are repeated.

While the shifting of the bottle from one position to another may be accomplished in a variety of ways, the present method contemplates dropping of the sediment from one side of the bottle to another as it progresses downwardly and does not rely upon a spiralling motion of the contents. Consequently, the shifting of the bottle from one inclined position to another is preferably accomplished without rotating the bottle. This is accomplished most conveniently by swinging the bottle between the desired positions through a vertical arc, that is, the longitudinal axis of the body will coincide with a vertical plane during the entire shifting operation.

It is desirable that the bottle be inclined somewhat from the vertical so that the accumulating sediment will drop from the upper side of the bottle each time it is shifted. For this purpose, it has been found that an inclination of approximately 20° from the vertical will provide optimum results. However, it should be noted that inclinations of somewhat more or less than 20° may be utilized, but with a dropping off of efficiency as the divergence progresses from the desired inclination of approximately 20°.

In accordance with the present invention, the bottle is vibrated during its sojourn between the described shifting from one position to another. The vibration assists the sediment in breaking loose from the upper side of the bottle and sets up a condition which facilitates the dropping of the sediment down to the desired position upon the removable cap. It has been found that a vibratory period of approximately 3000 cycles per minute is quite effective in achieving the desired results, although somewhat faster or slower vibratory rates may be successfully employed.

Preferably, the shifting of the bottle from one position to another is effected four times a day at six hour intervals, it having been found that shifting of the bottles any oftener apparently does not allow sufficient time for all of the extremely fine sediment to settle out, and shifting any less often, of course, does not make full use of the riddling action. In practice, the shifting is accomplished four times per day and the bottle is vibrated substantially immediately thereafter for approximately fifteen minutes at the previously described rate of approximately 3000 cycles per minute.

The apparatus of the present invention is designed to carry out the described method upon very large numbers of bottles simultaneously and automatically. A preferred form of this apparatus is illustrated in the accompanying drawings, in which:

FIG. 5 is an enlarged fragmentary detail view of a portion of the rack assembly of FIG. 4 showing the relative position of the rack components when bottles contained in the rack are tipped to one side;

FIG. 6 is a view similar to that of FIG. 5 but illustrating the relative position of the rack components when the bottles supported thereby are tipped to their other position; and FIG. 7 is a schematic view of a control apparatus for automatically operating the apparatus of FIGS. 1 and 2.

Figure 1:
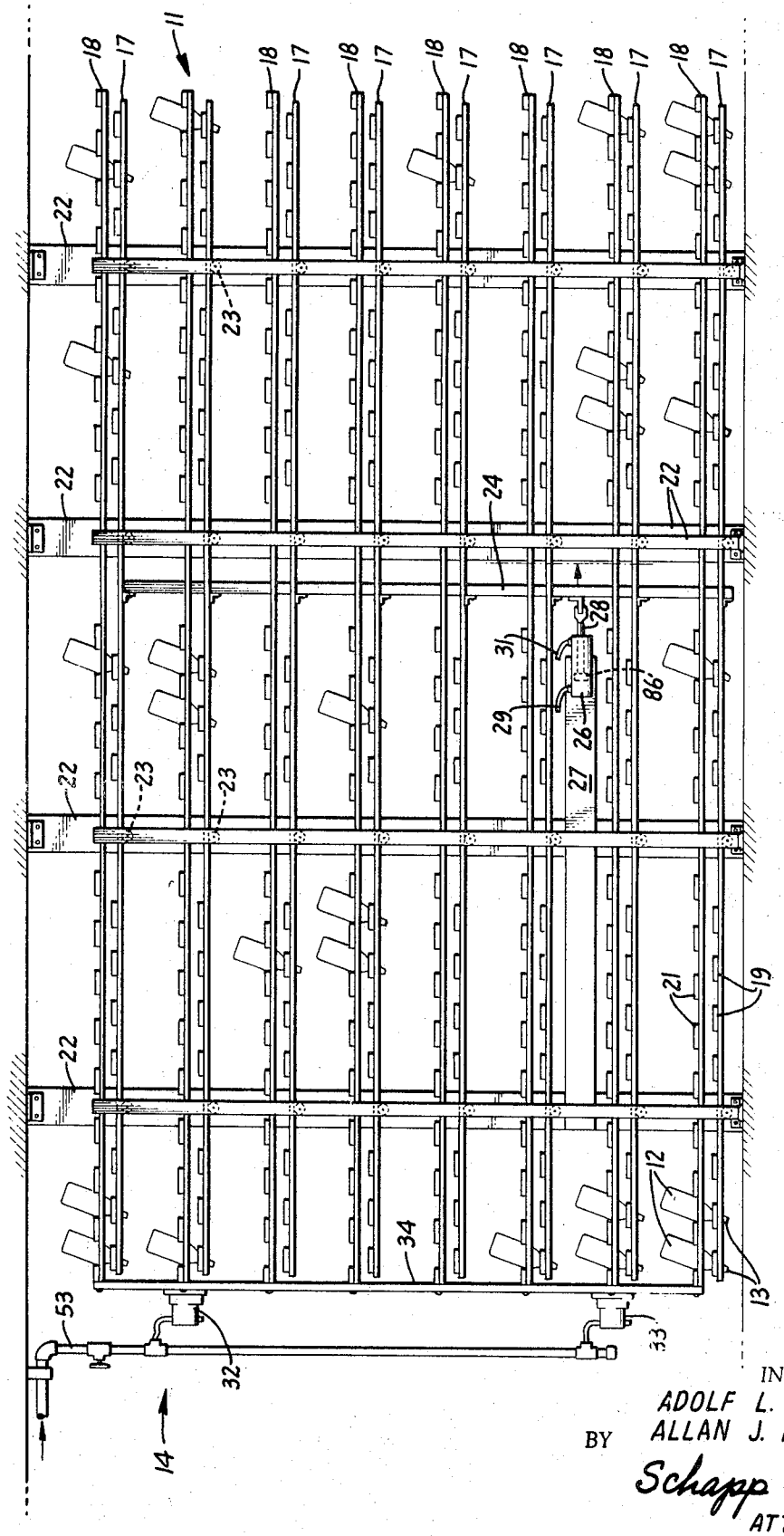
FIG. 1 is a side elevational view of an apparatus for riddling wines constructed in accordance with the present invention.
Figure 2:
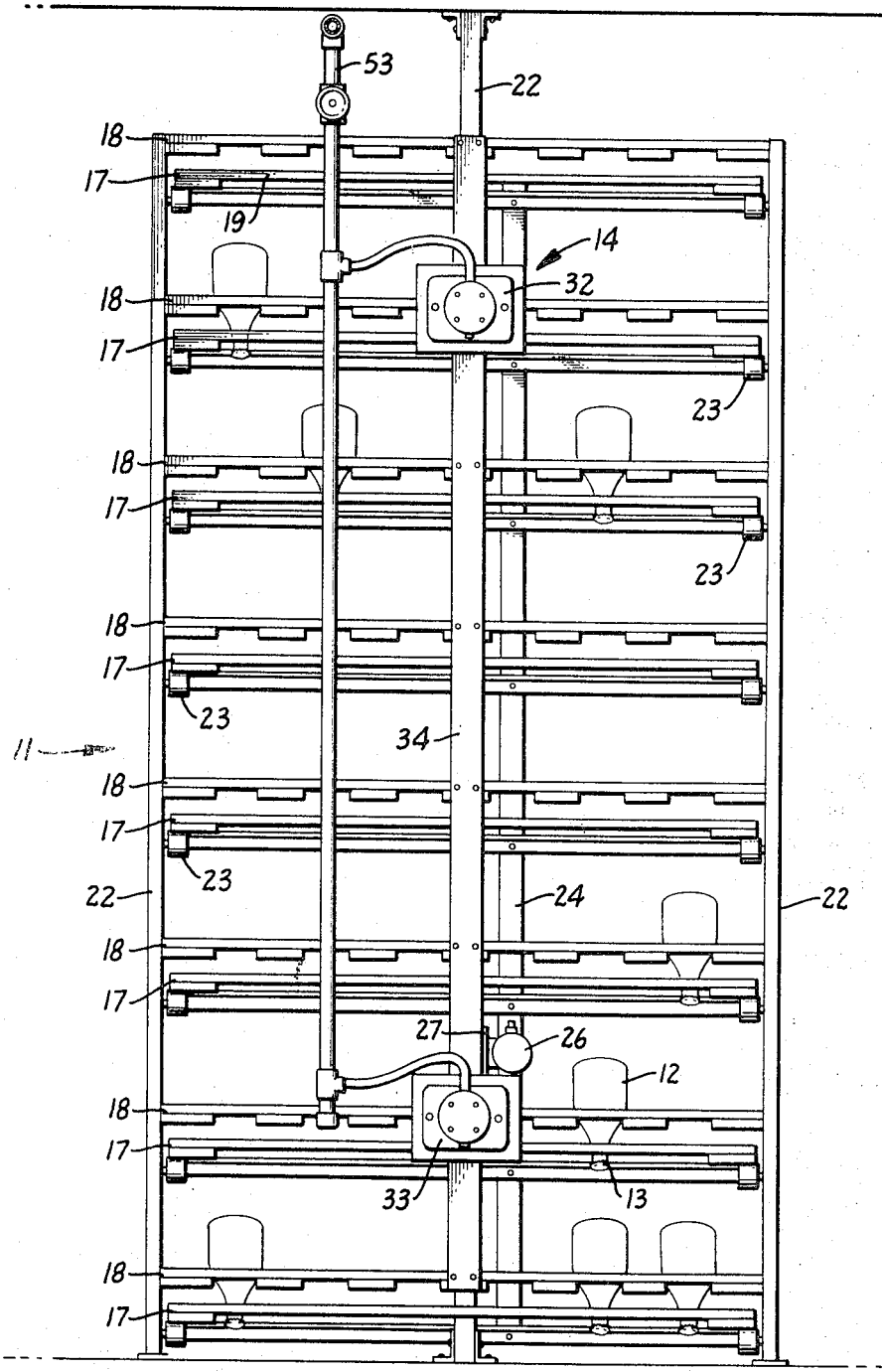
FIG. 2 is an end elevational view of the apparatus of FIG. 1.
Figure 4:
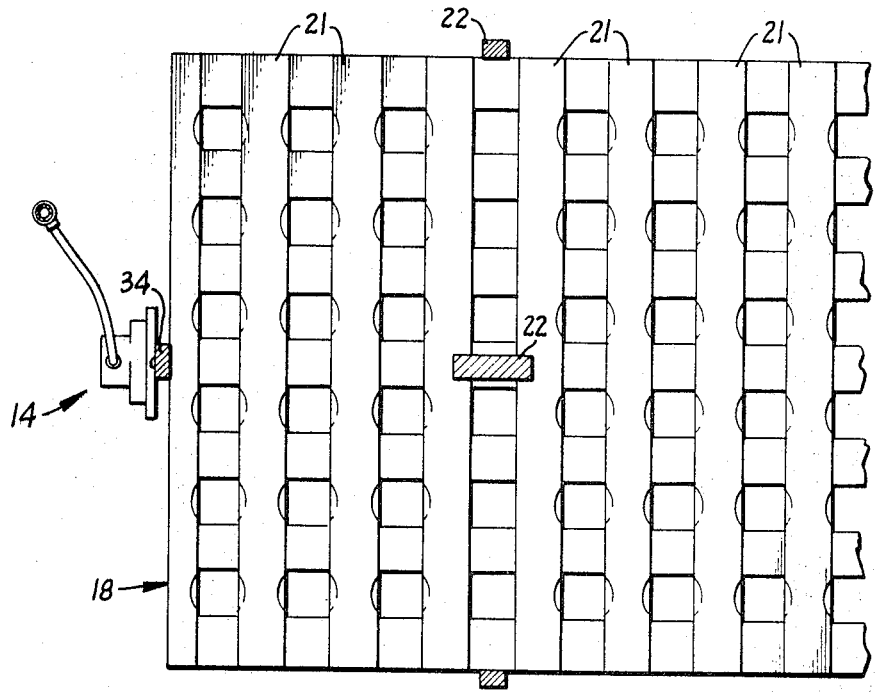
FIG. 4 is a fragmentary plan view of a rack assembly forming part of the apparatus of FIGS. 1 and 2.
Figure 3:
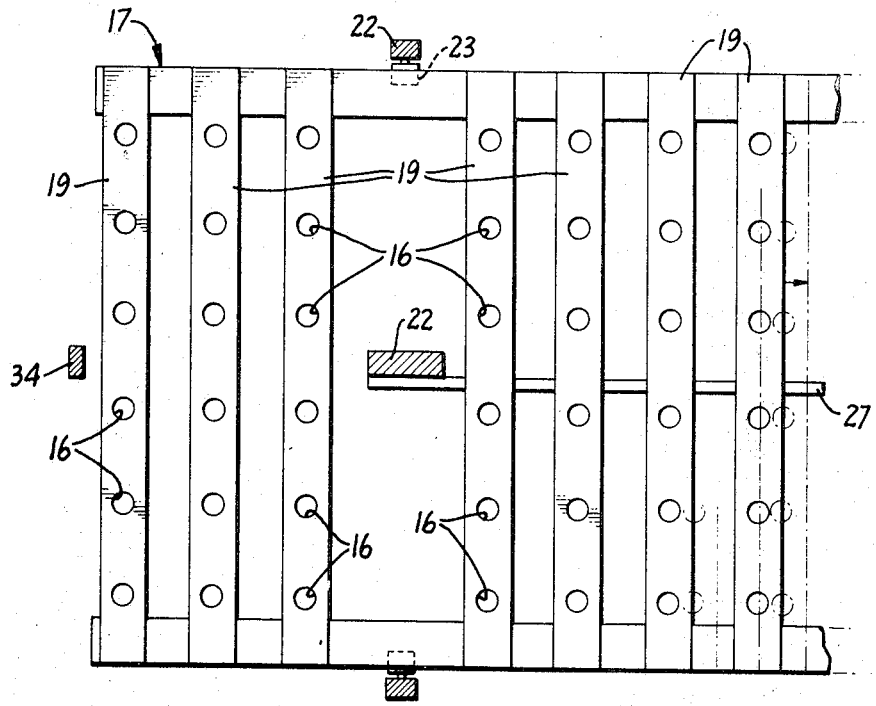
FIG. 3 is a fragmentary plan view of a rack component forming a portion of the apparatus of FIGS. 1 and 2.

Referring to the drawings in detail, it will be seen that the apparatus for riddling wine of the present invention consists essentially of rack means 11 for receiving and supporting the bottles 12 to be riddled in an inverted position with the bottle necks 13 down, the rack means being formed for selectively supporting the bottles 12 in first and second positions wherein the bottles may be tilted from the vertical in different directions periodically, so that the sediment will settle in the neck of the bottle. In addition, vibrator means 14 is provided for imparting a desired vibration to the bottles in a manner cooperative with the action of the rack means 11 to increase the efficiency of the novel riddling action.

In accordance with the present invention, the rack means 11 is formed for shifting the bottles back and forth between the positions shown in FIGS. 5 and 6, without rotating the bottles. This is accomplished by swinging the bottles from one position to the other through a vertical arc. As here shown, such swinging is easily and rapidly accomplished by engaging the neck 13 of each bottle 12 through a hole 16 formed in a lower rack member 17, with the body portion of each bottle 12 protruding upwardly through an upper rack member 18. With this construction, relative lateral movement between the rack members 17 and 18 will quickly shift the bottles from one position to the other.

As may best be seen from FIGS. 3, 4, 5 and 6, the lower rack member 17 is here formed with a plurality of cross pieces 19 through which the holes 16 are drilled at equally spaced intervals. The bottles 12 fit loosely between spaced transverse members 21 carried on the upper rack member 18. Thus, appropriate relative movement between the rack members 17 and 18, longitudinally of the rack means 11, will simultaneously cause the desired shifting from one position to the other of all of the bottles 12 contained in the rack means 11.

As here shown, the upper rack members 18 are affixed to and extend between vertical supports 22 to form the basic rack structure. The lower rack members 17, however, are supported on rollers 23 and are free to reciprocate from side to side, as viewed in FIG. 1 of the drawings. A vertically extending member 24 is attached to each of the rack members 17 and secures them together for joint movement.

The vibrator means 14 may be of any suitable type capable of imparting the desired vibration to the bottles 12. Thus, the vibrator may be mechanically, hydraulically, pneumatically or electrically actuated and may be operatively connected directly to the bottles or to the racks, or portions of racks, supporting the bottles. As here shown, the vibrator means 14 is connected to each of the upper rack members 18, and is of the well known pneumatically-actuated type. It has been found that operation of the vibrator means 14 at approximately 3000 vibrations per minute significantly increases the efficiency of the riddling action. Accordingly, it is preferred that the vibrator operate at or near such frequency. A suitable vibrator for this purpose is the Model M–1 manufactured by the Cleveland Vibrator Company, Cleveland, Ohio.

Of course, any suitable number of vibrator units may be employed, depending upon the number and size of bottles and the total mass to be vibrated. As here shown, two such vibrator units 32 and 33 are mounted at one end of the rack means 11 upon a vertical member 34 which is, in turn, connected to the upper rack members 18.

While the relative movement between the lower and upper rack members 17 and 18 could be accomplished manually, because of the extremely large number of quite heavy bottles which can be handled by the rack means 11, it is desirable to provide power means for effecting the desired reciprocation. As here shown, the powered actuation is provided by one or more two-way hydraulic cylinders 26 mounted on a suitable bracket 27 secured to the rack members 22 and having a piston rod 28 secured to the vertical member 24. With this construction, supplying of hydraulic fluid under pressure through one or the other of the cylinder lines 29 or 31 will accomplish the desired lateral movement of the lower rack members 17 and consequent shifting of the bottles 12 from one position to the other.

As an important feature of the present invention, the described shifting of the bottles and application of vibration may be carried out automatically and without the attention of human operators. When contrasted with the traditional method of riddling, in which each bottle must individually be lifted and rotated by hand, the savings in labor costs are apparent. This becomes very significant in the production of very high quality champagne and the like by the bottle fermentation method. Moreover, the length of time necessary to keep the bottles in the riddling racks is significantly decreasde because of the efficiency of riddling action provided by the present invention, and because the automaticaly operating feature makes it possible to manipulate the bottles at optimum frequency throughout the entire 24-hour day.

As may best be seen in FIG. 7 of the drawings, the control means 41 comprises timing means formed for activating the actuating means 26 and the vibrator means 14 at pre-selected times and for periods of desired duration. As here shown, the vibrator means 14 is controlled by a timer which includes the synchronous motor 42 connected by leads 43 and 44 to a suitable source of alternating current. One or more cams 46 are operatively associated with and rotated by the motor 42. Each of the cams 46 is rotated in such manner that a cam lobe 47 periodically closes a normally open switch 48 to supply power through leads 49 and 51 to a solenoid valve 52 interposed in a pneumatic supply line 53 for the vibrator units 32 and 33, causing air under pressure from a suitable source (not shown) to be supplied through line 53 to activate the vibrator means 14.

The control means 41 accomplishes automatic shifting of the bottles 12 betwen the positions shown in FIG. 5 and 6 through the use of a synchronous motor 56 driving a pair of cams 57 and 58 in such manner that cam lobes 59 and 61 intermittently close normally open switches 62 and 63. Switch 62 supplies power through leads 64 and 66 to an actuating solenoid 67 for a two-way valve 68. Similarly, normaly open switch 63, when closed, supplies power through leads 64 and 69 to an actuating solenoid 71 for a two-way valve 72. Valves 68 and 72 are arranged to selectively communicate the opposite ends of hydraulic cylinder 26 with either the inlet or the outlet of a hydraulic pump 74, the drive motor 76 of the pump 74 being connected through leads 77, 78 and 79 to a suitable source of current.

The synchronous motor 56 is adapted to rotate cams 57 and 58 one-half revolution during the desired "rest" period between each shifting operation. Thus, when cam lobe 59 closes normaly open switch 62, power will be supplied through lead 66 to solenoid 67, which will move valve 68 to the position shown in dotted lines in FIG. 7. Simultaneously, relay 81 will be energized to in turn energize relay 82 through leads 83 and 84. This causes relay 82 to supply current to hydraulic pump motor 76, causing the pump 74 to operate during the dwell period of cam lobe 59. At this time, valve 68 communicates the outlet of the pump with the front end of hydraulic cylinder 26, while the valve 72 connects the intake end of pump 74 to the rear end of hydraulic cylinder 26. This causes piston 86 to retract into the hydraulic cylinder 26, shifting the rack means 11 to tilt the bottles 12 to the position shown in FIG. 5 of the drawings. As soon as cam lobe 59 passes and allows switch 62 to open, relay 81 is deenergized, causing relay 82 to cut off the current supply to pump motor 76 and, at the same time, solenoid 67 returns two-way valve 68 to the position indicated in FIG. 7. A desired time later, cam load 61 closes normally open switch 63 supplying current through lead 69 to solenoid 71, which rotates valve 72 to the position indicated in dotted lines in FIG. 7. At the same time, relay 87 is energized to in turn energize relay 82 and again supply current to pump motor 76. The pump 74 will then operate and, since the rear end of hydraulic cylinder 26 is now connected to the outlet of pump 74 and the front end to the inlet of pump 74, piston 86 will move forward in the cylinder and effect shifting of the rack means 11 to cause the bottles 12 to assume the position illustrated in FIG. 6 of the drawings.

It should be noted that the synchronous motors 42 and 56 are coordinated so that the described vibration is imparted to the bottles at a desired time with respect to the shifting of the bottles. It has been found that very good results may be obtained by shifting the bottles every six hours and imparting the described vibration to the rack and bottles for a period of about fifteen minutes immediately following the shifting operation. It should also be noted that the described control system is adapted to operate a plurality of riddling racks through the provision of additional cams 46 and additional hydraulic lines, all as illustrated in dotted lines in FIG. 7 of the drawings.

From the foregoing, it will be seen that the present invention provides a novel method of and apparatus for accomplishing riddling of wines or the like with greatly increased efficiency in the riddling operation and with great savings in labor required.

We claim:

1. An apparatus for riddling wines comprising:
   rack means adapted for receiving wine bottles or the like in inverted position and formed for selectively supporting each of such bottles in a plurality of positions inclined from the vertical in different directions, and
   a vibrator means operatively connected to said bottles for imparting a desired vibration thereto.

2. An apparatus for riddling wines as described in claim 1, and wherein said vibrator means is connected to said rack means for vibrating the latter and the bottles supported thereon.

3. An apparatus for riddling wines, comprising rack means adapted for receiving wine bottles or the like in inverted position and formed for supporting each of said bottles in a selected one of a plurality of positions inclined from the vertical in different directions, said rack means comprising;
   a plurality of pairs of vertically spaced relatively movable rack members for shifting said bottles between said plurality of positions, with the lower rack member of each pair being formed with bottle receiving means at spaced locations for receiving and supporting the necks of the bottles and the upper rack member of each pair being formed for engaging the bottles supported on the lower rack member so as to maintain the bottles in the desired position.

4. An apparatus for riddling wines as described in claim 3, and wherein said upper and lower rack members extend generally horizontally and are mounted to be horizontally reciprocable with respect to each other for shifting the bottles supported thereby between two desired positions through a substantially vertical arc.

5. An apparatus for riddling wines as described in claim 4, and wherein actuating means is operatively connected to said rack means for effecting relative reciprocation between said upper and lower rack members.

6. An apparatus for riddling wines as described in claim 5, and wherein control means is operatively connected to said actuating means for activating the latter at pre-selected times whereby the riddling action will be carried out automatically.

7. An apparatus for riddling wines as described in claim 6, and wherein said control means is also formed to activate said vibrator means at pre-selected times and in synchronism with the activation of said actuating means.

8. An apparatus for riddling wines as described in claim 7, and wherein said control means includes timing means formed for activating said actuating means and said vibrator means at pre-selected times and for periods of desired duration.

References Cited

UNITED STATES PATENTS

| | | | |
|---|---|---|---|
| 2,056,014 | 9/1936 | Moore | 259—54 |
| 2,487,033 | 11/1949 | Thurman | 259—54 |

ROBERT W. JENKINS, Primary Examiner

U.S. Cl. X.R.

99—277.2